(12) United States Patent
Mo et al.

(10) Patent No.: US 10,197,432 B2
(45) Date of Patent: Feb. 5, 2019

(54) LIQUID LEVEL SENSOR THAT ADAPTS TO PRESSURE CHANGES

(71) Applicant: COAVIS, Sejong-si (KR)

(72) Inventors: Dong Heon Mo, Sejong-si (KR); Hae Seong Kim, Mokpo-si (KR)

(73) Assignee: COAVIS, Sejong-si (KR)

( * ) Notice: Subject to any disclaimer, the term of this patent is extended or adjusted under 35 U.S.C. 154(b) by 188 days.

(21) Appl. No.: 15/153,587

(22) Filed: May 12, 2016

(65) Prior Publication Data

US 2016/0341592 A1 Nov. 24, 2016

(30) Foreign Application Priority Data

May 20, 2015 (KR) .......................... 10-2015-0070508

(51) Int. Cl.
*G01F 23/36* (2006.01)
*G01F 15/14* (2006.01)

(52) U.S. Cl.
CPC ............ *G01F 23/363* (2013.01); *G01F 15/14* (2013.01)

(58) Field of Classification Search
CPC ......... G01F 15/14; G01F 23/363; G01F 23/36
See application file for complete search history.

(56) References Cited

U.S. PATENT DOCUMENTS

| 2,369,027 | A | * | 2/1945 | De Giers | G01F 23/36 |
| | | | | | 73/313 |
| 7,621,182 | B2 | * | 11/2009 | Chen | G01F 23/363 |
| | | | | | 116/229 |
| 8,291,946 | B2 | * | 10/2012 | Lim | H01C 10/36 |
| | | | | | 141/198 |
| 2012/0037243 | A1 | * | 2/2012 | Taylor | F16K 17/196 |
| | | | | | 137/209 |

FOREIGN PATENT DOCUMENTS

GB  497449 A * 12/1938 ............. G01F 23/34

* cited by examiner

*Primary Examiner* — Justin N Olamit
(74) *Attorney, Agent, or Firm* — McCoy Russell LLP (57) ABSTRACT

Provided is a liquid level sensor for a fuel tank including: a case having a filled liquid filled therein and closed; a resistor substrate provided in the case and a wiper contacting the resistor substrate; and a damper provided in the case and absorbing a pressure change of an inner portion of the case. The liquid level sensor for a fuel tank is configured to absorb a pressure change of the inner portion of the case, thereby making it possible to prevent leakage of the filled liquid that may occur due to the pressure change of the inner portion of the case.

2 Claims, 8 Drawing Sheets

LIQUID LEVEL SENSOR THAT ADAPTS TO PRESSURE CHANGES

CROSS-REFERENCE TO RELATED APPLICATIONS

This application claims priority under 35 U.S.C. § 119 to Korean Patent Application No. 10-2015-0070508, filed on May 20, 2015, in the Korean Intellectual Property Office, the disclosure of which is incorporated herein by reference in its entirety.

TECHNICAL FIELD

The following disclosure relates to a liquid level sensor for a fuel tank. More particularly, the following disclosure relates to a liquid level sensor for a fuel tank capable of preventing leakage of a filled liquid that may occur due to a pressure change of an inner portion of a case in the liquid level sensor closed in a state in which the filled liquid is filled in the case.

BACKGROUND

Generally, vehicles include fuel tanks provided in order to accommodate various fuels required for driving of an engine. Among these fuel tanks, a fuel tank accommodating a liquid-phase fuel therein includes a liquid level sensor provided in order to allow a driver to recognize a residual amount of fuel.

The liquid level sensor of the fuel tank is classified into a mechanical liquid level sensor in which a floater floats on a liquid-phase fuel to allow a resistance value to be changed depending on a height change of the floater and an electronic liquid level sensor directly detecting a height of a liquid-phase fuel without using a separate floater. Among them, the mechanical liquid level sensor has been currently used widely due to a cheap cost.

Figure 1:
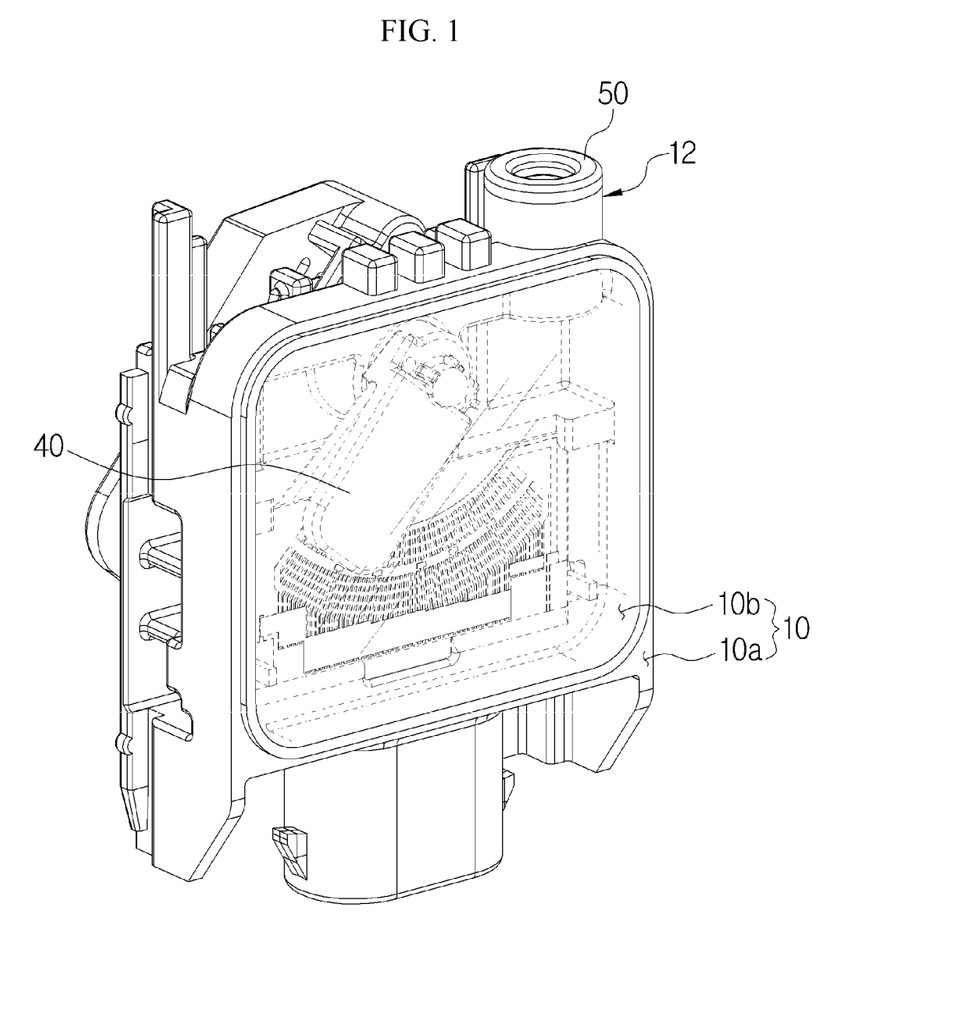
FIG. 1 is an assembled perspective view illustrating a liquid level sensor for a fuel tank according to the related art.
Figure 2:
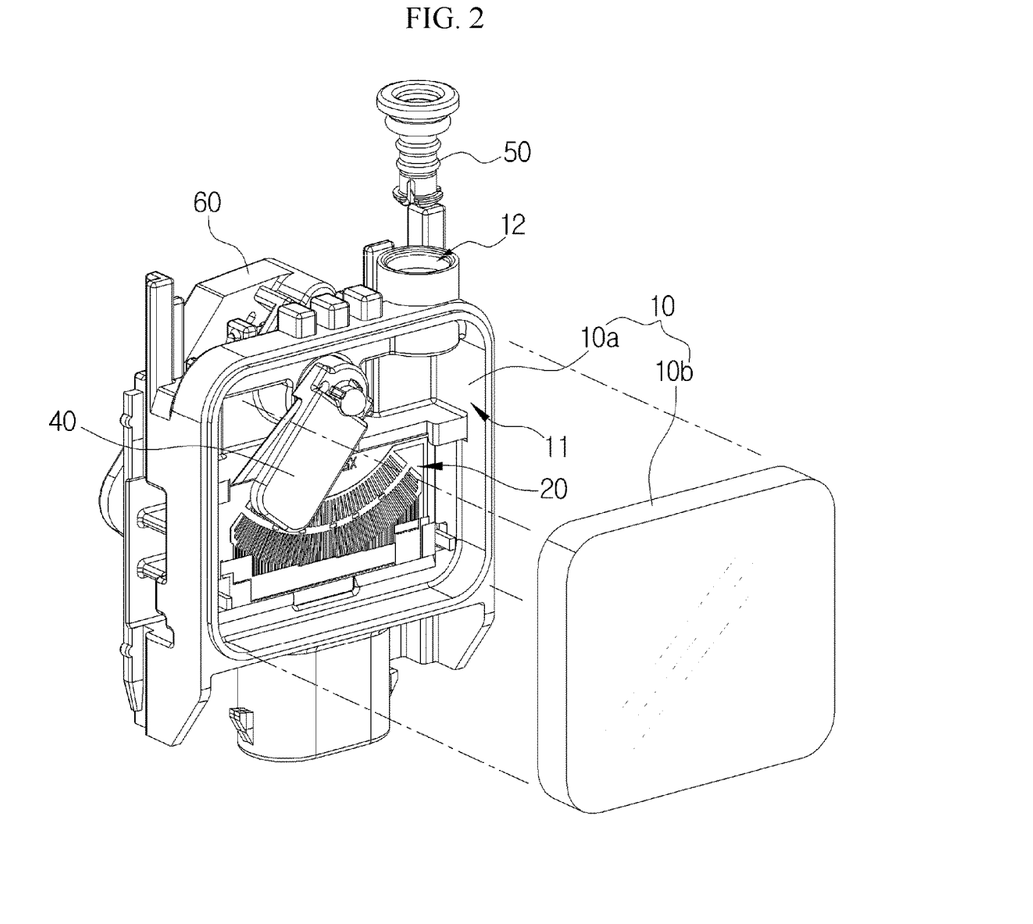
FIG. 2 is an exploded perspective view illustrating a liquid level sensor for a fuel tank according to the related art.

FIGS. 1 and 2 are perspective views illustrating a liquid level sensor for a fuel tank according to the related art. The liquid level sensor for a fuel tank according to the related art is configured to include a case 10, a resistor substrate 20 provided in the case 10 and formed radially in a predetermined angle range, an arm having one side rotatably coupled to the case 10 and the other side coupled to a floater, and a wiper 40 coupled to the arm so as to be rotated together with the arm and contacting the resistor substrate 20, as illustrated in FIGS. 1 and 2. Here, one side of the arm is coupled and fixed to an arm installation rotating body 60 of which a shaft is coupled to the case 10, and the wiper 40 is coupled to the shaft. Therefore, the arm installation rotating body 60 and the wiper 40 may also be configured to be rotated together with the arm depending on rotation of the arm.

In the liquid level sensor for a fuel tank according to the related art configured as described above, the case 10 is fixed to be disposed in the fuel tank, and the floater ascends and descends depending on a liquid level of a fuel, such that the wiper 40 is rotated together with the arm 30.

Therefore, a contact protrusion of the wiper 40 contacts different positions of the resistor substrate 20 while being rotated within a predetermined angle in a state in which it contacts a circuit pattern of the resistor substrate 20, and the resistor substrate 20 variably represents a resistance value depending on a residual amount of the fuel, thereby making it possible to display the residual amount of the fuel on an instrument panel of the vehicle.

However, in the liquid level sensor a fuel tank according to the related art, since a contact portion between the resistor substrate and the wiper contacting each other to represent different resistance values are exposed to the fuel or the air, when the contact portion between the resistor substrate and the wiper is made of a silver based material containing a large amount of silver (Ag) component, the contact portion is easily oxidized and corroded by a sulfur component of the fuel. Furthermore, abrasion occurs due to a continuous contact between the resistor substrate and the wiper to reduce durability, such that it is difficult to detect an accurate residual amount of the fuel. In addition, recently, a bio-fuel, or the like, has been developed and used. However, the corrosion and the abrasion as described above may be more rapidly made at the time of using the bio-fuel.

In order to solve the problems described above, a technology of injecting a liquid (hereinafter, referred to as a "filled liquid") that may perform lubrication and anti-corrosion actions into an internal space of the case in which the resistor substrate and the wiper are positioned and closing the case has been developed. Therefore, the resistor substrate and the wipers do not contact the fuel within the fuel tank, and an abrasion phenomenon due to friction between the resistor substrate and the wiper does not occur.

However, in the liquid level sensor for a fuel tank of which the case is closed in a state in which the filled liquid is filled in the case, when a pressure difference between the inner portion and an outer portion of the case is generated due to a pressure change, a temperature change, or the like, of the outer portion of the case, the case is deformed or damaged, such that there is the possibility that the filled liquid in the case will be leaked to the outer portion of the case. In addition, in the case in which the arm or the shaft coupled to the arm penetrates through the case to thereby be rotatably coupled to the case, when a pressure difference between the inner portion and the outer portion of the closed case is generated, the filled liquid in the case may be leaked to the outer portion of the case through a space between the arm or the shaft and a sealing member contacting each other.

In this case, durability of the wiper and the resistor substrate is reduced, and reliability of detection of a fuel flow rate is also reduced.

SUMMARY

An embodiment of the present invention is directed to providing a liquid level sensor for a fuel tank capable of preventing leakage of a filled liquid that may occur due to a pressure change of an inner portion of a case in the liquid level sensor closed in a state in which the filled liquid is filled in the case by absorbing the pressure change of the inner portion of the case.

In one general aspect, a liquid level sensor for a fuel tank includes: a case having a filled liquid filled therein and closed; a resistor substrate provided in the case and a wiper contacting the resistor substrate; and a damper provided in the case and absorbing a pressure change of an inner portion of the case.

The case may include a communication part allowing the inner portion and an outer portion of the case to be in communication with each other, and the damper may be formed of a diaphragm made of a flexible material and be coupled to the communication part so as to close the communication part.

Alternatively, the case may include a communication part allowing the inner portion and an outer portion of the case to be in communication with each other, the damper may be coupled to the communication part so as to close the communication part, and the damper may include: a hollow pipe of which an inner portion is hollow and both ends are opened; and a baffle provided in the inner portion of the hollow pipe, closely adhered to an inner peripheral surface of the hollow pipe, and coupled to the hollow pipe to be movable along the inner portion of the hollow pipe. The damper may further include steps protruding at both ends of the inner peripheral surface of the hollow pipe, and the baffle may be configured so as not to be separated from the inner portion of the hollow pipe by the steps. The damper may further include an elastic means having one side coupled to the hollow pipe and the other side coupled to the baffle.

The case may include a base body of which an inner portion is hollowed and one side is opened and a cover coupled to the base body so as to close opened one side of the base body, and the damper may be provided in the base body or the cover.

Alternatively, the case may include a filled liquid inlet and a cap coupled to the filled liquid inlet to close the filled liquid inlet, and the damper may be provided in the cap.

The damper may be formed integrally with the cap.

One end of an arm may penetrate through the case to thereby be rotatably coupled to the case or a shaft of an arm installation rotating body to which the arm is fixed may penetrate through the case to thereby be rotatably coupled to the case, and one end of the arm or the shaft may be coupled to the wiper, and a sealing part may be provided between the case and one end of the arm or between the case and the shaft.

DETAILED DESCRIPTION OF MAIN ELEMENTS

1000: liquid level sensor
100: case
110: base body
111: filled liquid inlet
112: fixing groove
120: cover
121: catching protrusion
122: communication part
130: sealing member
140: filled liquid filling space
200: resistor substrate
300: arm
400: wiper
500: cap
600: arm installation rotating body
610: shaft
700: sealing part
800: floater
900: damper
910: diaphragm
920: hollow pipe
921: step
930: baffle
940: elastic means

DETAILED DESCRIPTION OF EMBODIMENTS

Hereinafter, a liquid level sensor for a fuel tank according to the present invention will be described in detail with reference to the accompanying drawings.

FIGS. 3 to 8 are views illustrating a liquid level sensor for a fuel tank according to the present invention.

As illustrated, the liquid level sensor 1000 for a fuel tank according to the present invention may be configured to include a case 100 having a filled liquid filling space 140 formed therein and closed; a resistor substrate 200 provided in the case 100 and a wiper 400 contacting the resistor substrate 200; and a damper 900 provided in the case 100 and absorbing a pressure change of an inner portion of the case 100.

The liquid level sensor 1000 for a fuel tank is disposed and fixed in the fuel tank, and is configured so that the wiper 400 connected to a floater 800 through an arm 300 is rotated while the floater 800 ascends or descends depending on a liquid level in a state in which it floats on a surface of a fuel. In addition, a contact protrusion of the wiper 400 contacts a resistor pattern formed on the resistor substrate 200 to variably represent a resistance value depending on a residual amount of the fuel. Here, the arm 300 may be formed to be rotated by various methods. As an example, one end of the arm 300 penetrates through and is coupled to the case 100 in a form in which it is inserted into the case 100, such that the wiper 400 is fixed to the arm 300, or one end of the arm 300 may be fixed to an arm installation rotating body 600 and a shaft 610 formed in the arm installation rotating body 600 penetrates through and is coupled to the case 100 in a form in which it is inserted into the case 100, such that the wiper 400 may be fixed to the arm 300.

The case 100 has a hollow formed therein, such that the closed filled liquid filling space 140 is present in the case 100, and a filled liquid that may perform anti-corrosion and lubrication actions may be filled in the filled liquid filling space 140. Here, the filled liquid may be fully filled in the filled liquid filling space 140 or some of air may be present, in addition to the filled liquid, in the filled liquid filling space 140.

The resistor substrate 200 and the wiper 400 are provided in the filled liquid filling space 140 formed in the case 100. Here, the resistor substrate 200 may be coupled and fixed to one side of the inner portion of the case 100, and the wiper 400 may be provided to be rotatably in the case 100 to thereby be rotated together with the arm 300 depending on rotation of the arm 300.

The damper 900 may be provided in the case 100, and serves to absorb the pressure change of the inner portion of the case 100. That is, the damper 900 constantly maintains a pressure of the inner portion of the case 100. The liquid level sensor 1000 for a fuel tank is disposed in the fuel tank and may be configured so that the arm 300 is rotated depending on a height change in the residual amount of the fuel, and a pressure difference between the inner portion and an outer portion of the case 100 may be generated depending on the residual amount of the fuel or a change in an external atmospheric pressure. As an example, the pressure difference between the inner portion and the outer portion of the case 100 may be generated depending on a temperature change in the fuel or a temperature change of the outer portion of the case 100. The damper 900 may reduce the pressure difference between the inner portion and the outer portion of the case 100.

When a pressure (an atmospheric pressure) of the outer portion of the case 100 becomes low or a temperature of the fuel or a temperature of the outer portion becomes high, a pressure of the inner portion of the case 100 becomes higher than that of the outer portion of the case 100, such that the filled liquid and the air present in the case 100 are expanded. In this case, the damper 900 absorbs this pressure change, thereby making it possible to prevent a rise in a pressure of the inner portion of the case 100, deformation of the case 100, and the like. Likewise, also in the case in which a pressure of the inner portion of the case 100 becomes lower than that of the outer portion of the case 100, the damper 900 may absorb this pressure change.

As described above, in the liquid level sensor 1000 for a fuel tank according to an exemplary embodiment of the present invention, since the damper absorbs the pressure change of the inner portion of the case, even though a pressure or a temperature of the outer portion of the case is changed, the filled liquid is not leaked to the outer portion of the case. Therefore, durability of the resistor substrate and the wiper in the liquid level sensor 1000 for a fuel tank may be improved, and reliability of the liquid level sensor 1000 for a fuel tank may be improved.

[First Exemplary Embodiment]

Figure 3:
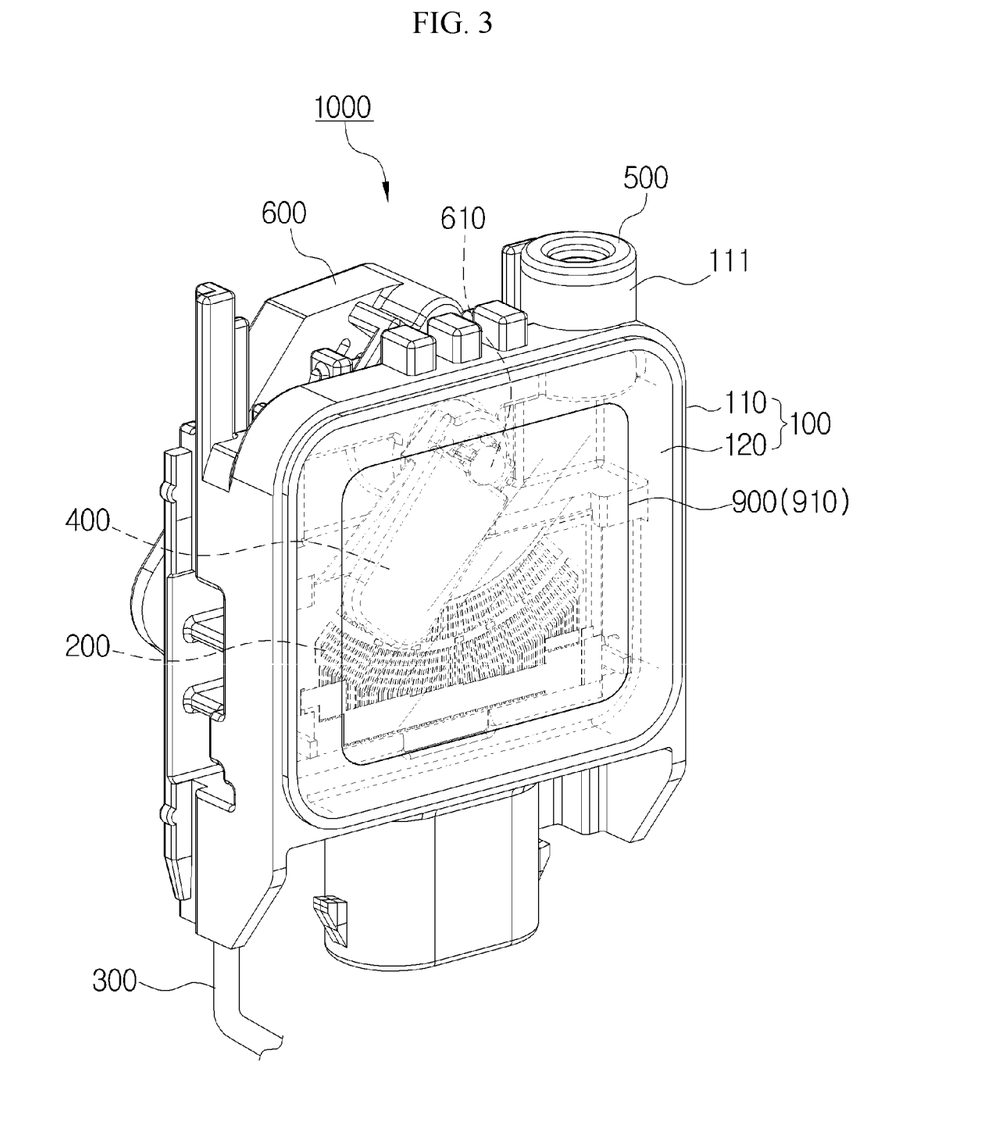
FIG. 3 is an assembled perspective view illustrating a liquid level sensor for a fuel tank including a damper according to a first exemplary embodiment of the present invention.
Figure 4:
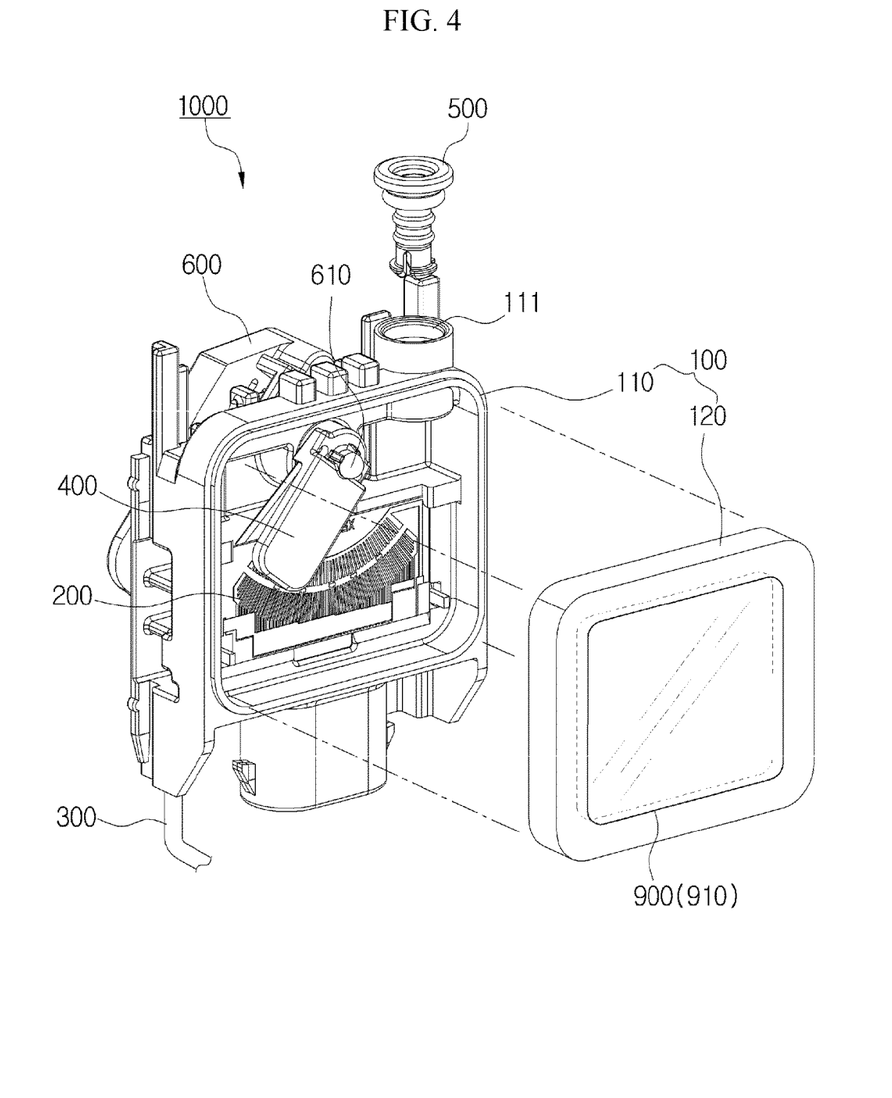
FIG. 4 is an exploded perspective view illustrating a liquid level sensor for a fuel tank including a damper according to a first exemplary embodiment of the present invention.
Figure 7:
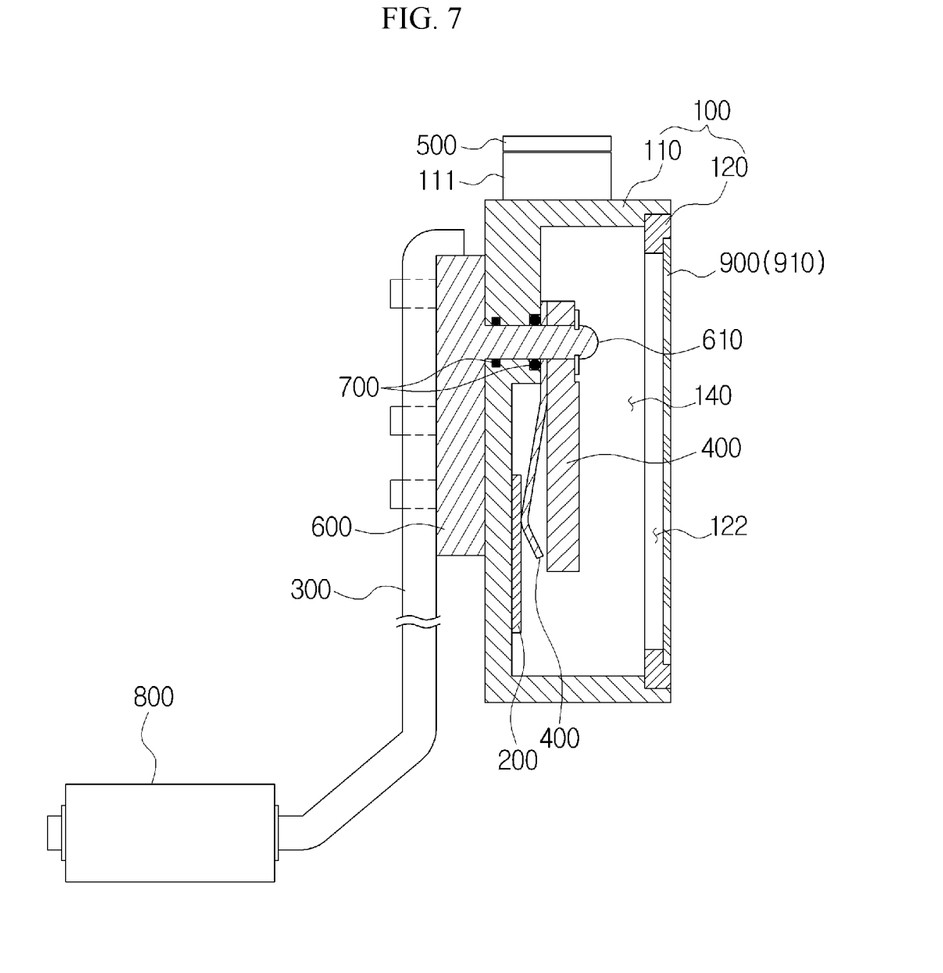
FIG. 7 is a lateral cross-sectional view illustrating a liquid level sensor for a fuel tank in which a damper according to a first exemplary embodiment of the present invention is included in a cover and a case.
Figure 8:
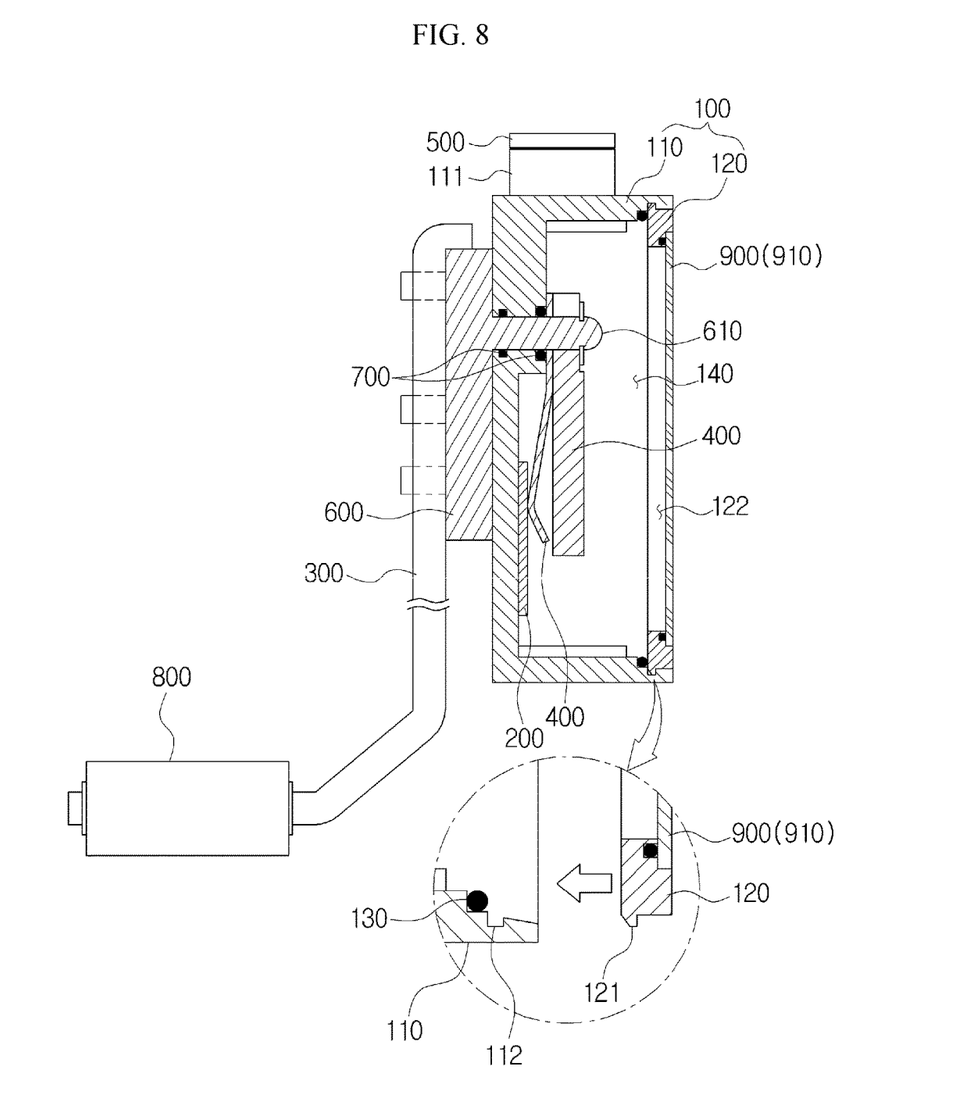
FIG. 8 is a lateral cross-sectional view illustrating a liquid level sensor for a fuel tank in which a damper according to a first exemplary embodiment of the present invention is included in a cover and a case.

FIGS. 3 and 4 are, respectively, an assembled perspective view and an exploded perspective view illustrating a liquid level sensor for a fuel tank including a damper according to a first exemplary embodiment of the present invention. FIGS. 7 and 8 are lateral cross-sectional views illustrating a liquid level sensor for a fuel tank in which a damper according to a first exemplary embodiment of the present invention is provided in a cover.

As illustrated, the case 100 has a communication part 122 formed therein in order to allow the inner portion and the outer portion of the case 100 to be in communication with each other, and the damper 900 is formed of a diaphragm 910 made of a flexible material and may be coupled to the case 100 so as to close the communication part 122.

That is, the diaphragm 910 coupled to the case 100 may be the damper 900, and the diaphragm 910 is made of the flexible material and is deformed depending on the pressure change of the inner portion of the case 100, thereby making it possible to allow the pressure of the inner portion of the case 100 to be constantly maintained. Therefore, deformation of and damage to the case 100 may be prevented, and leakage of the filled liquid to the outer portion of the case 100 may be prevented.

Here, the diaphragm 910 is made of the flexible material, for example, an elastic material such as rubber. Therefore, even though the pressure of the inner portion of the case 100 is repeatedly changed, the diaphragm 910 is repeatedly deformed and then returns to its original form, thereby making it possible to continuously absorb the pressure change of the inner portion of the case 100. In addition, the diaphragm 910 may be formed at various positions of the case 100, and may be made of various materials.

[Second Exemplary Embodiment]

Figure 5:
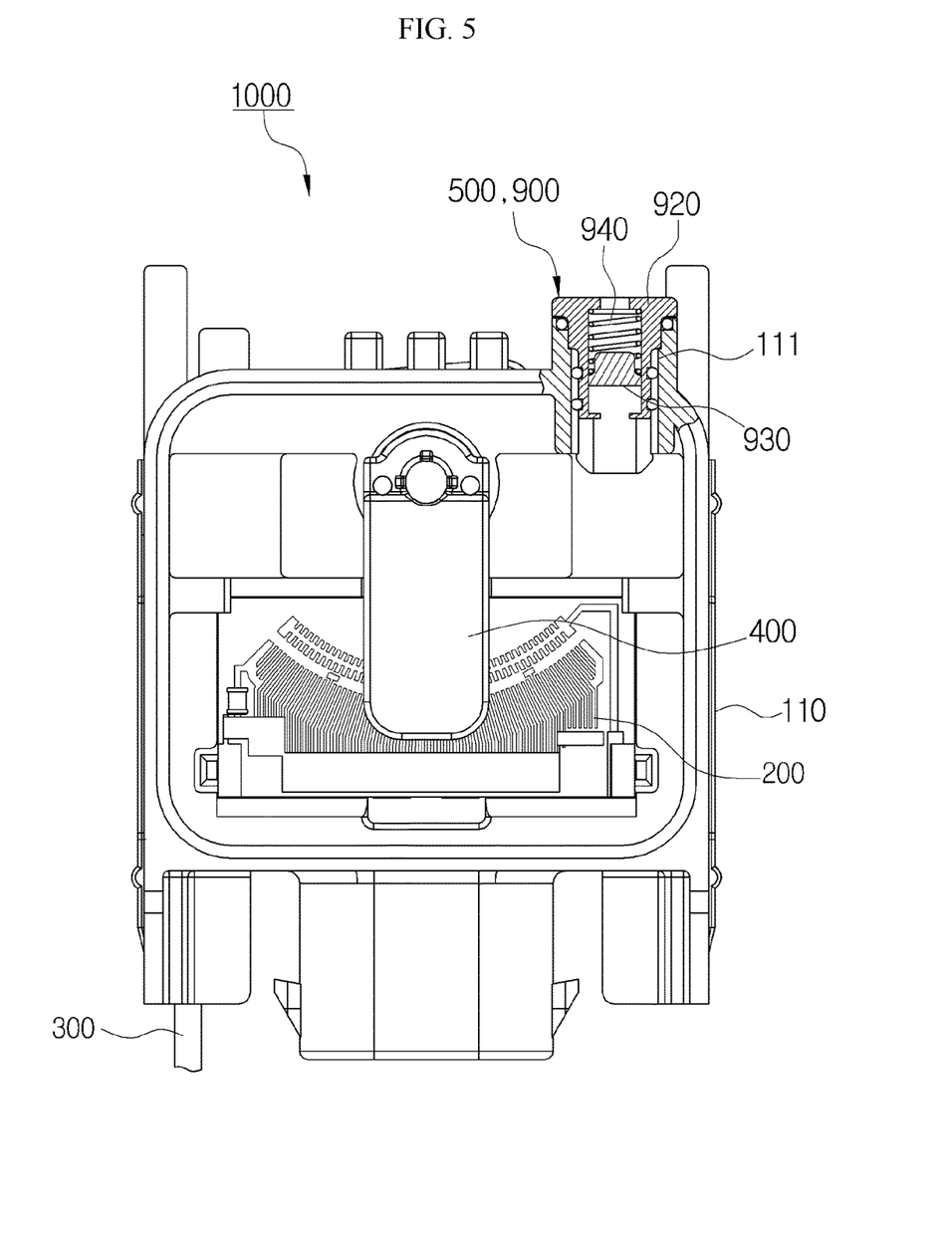
FIG. 5 is a front view illustrating a liquid level sensor for a fuel tank including a damper according to a second exemplary embodiment of the present invention.
Figure 6:
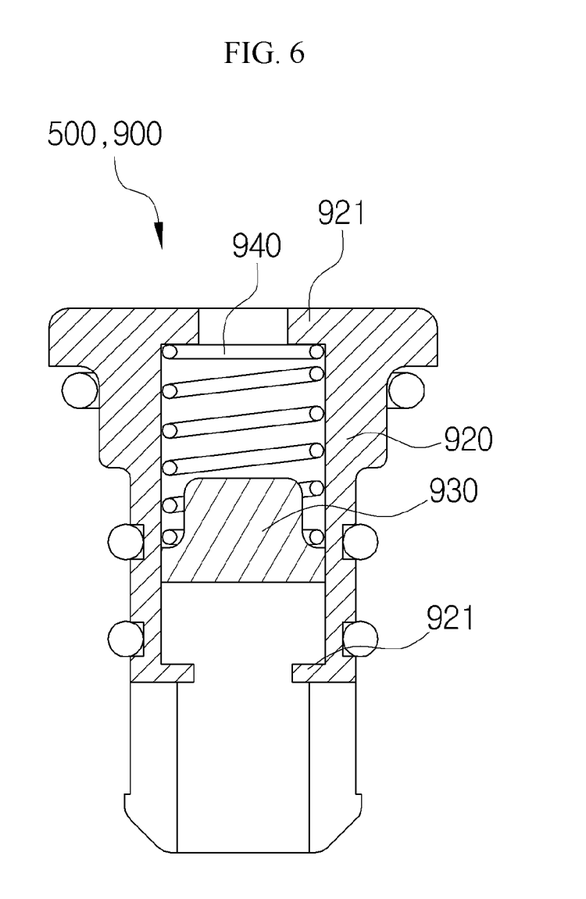
FIG. 6 is a cross-sectional view illustrating the damper of the liquid level sensor for a fuel tank according to a secondary embodiment of the present invention.

FIGS. 5 and 6 are, respectively, a front view illustrating a liquid level sensor for a fuel tank including a damper according to a second exemplary embodiment of the present invention and a cross-sectional view illustrating the damper.

The damper 900 may be configured to include a hollow pipe 920 of which an inner portion is hollowed and both ends are opened, and a baffle 930 provided in the inner portion of the hollow pipe 920, closely adhered to an inner peripheral surface of the hollow pipe 920, and coupled to the hollow pipe 920 to be movable along the inner portion of the hollow pipe 920.

That is, the damper 900 may be configured to absorb a pressure change by movement of the baffle 930 that may be moved in a length direction along the inner portion of the hollow pipe 920 in the case in which the pressure change is generated in the inner portion of the case 100 in a state in which the filled liquid filling space 140 is closed.

Here, the damper 900 may be coupled to the communication part(122) formed in the case 100 in a form in which the hollow pipe 920 is inserted into the communication part(122). Alternatively, the damper 900 may be coupled to the communication part(122) in a form in which the hollow pipe 920 protrudes outwardly of the case 100. In addition, the damper 900 may be formed in various forms in addition to the form illustrated in FIGS. 5 and 6. Further, the baffle 930 may be formed in a piston form so that it is easily moved in the inner portion of the hollow pipe 920, and may be formed in various forms in addition to the piston form.

Steps 921 that protrude may be formed at both ends of the inner peripheral surface of the hollow pipe 920. Therefore, separation of the baffle 930 from the inner portion of the hollow pipe 920 may be prevented by the steps 921.

In addition, the damper may further include an elastic means 940 disposed in the hollow pipe 920 One side of the elastic means 940 is coupled to the hollow pipe 920, and the other side thereof is coupled to the baffle 930. The baffle 930 moves only by a specific pressure change or more by the elastic means 940. Therefore, abrasion of an outer peripheral surface of the baffle 930 closely adhered to the inner peripheral surface of the hollow pipe 920 may be reduced. In addition, vibration of the baffle 930 may be prevented by the elastic means 940.

Hereinabove, forms in which the damper is provided according to exemplary embodiments of the present invention have been described.

In the liquid level sensor for a fuel tank according to an exemplary embodiment of the present invention, the case 100 may be configured to include a base body 110 of which an inner portion is hollowed and one side is opened and a cover 120 coupled to the base body 110 so as to close opened one side of the base body 110, and the damper 900 may be formed in the base body 110 or the cover 120.

In other words, the case 100 includes the base body 110 having a container form of which an inner portion is hollowed and one side is opened so that the filled liquid may be filled in the case 100, and includes the cover 120 coupled to opened one side of the base body 110, such that the case 100 may have a closed form. Here, the damper 900 may be provided in the base body 110 or the cover 120. In the case in which the damper 900 is formed of the diaphragm 910 in the cover 120 as illustrated, the communication part 122 penetrating through both surfaces of the cover 120 may be formed in the cover 120, and one side of the communication part 122 may be closed by the diaphragm 910. Here, the diaphragm 910 may be coupled to a surface (an inner side surface) of the cover 120 facing the base body 110 or an opposite surface (an outer side surface) of the cover 120 to the surface. However, in the case in which the diaphragm 910 is disposed on the outer side surface as illustrated, when the diaphragm 910 is deformed inwardly by the pressure difference between the inner portion and the outer portion of the case 100 (a pressure reduction of the inner portion), interference with the wiper 400 may be avoided. In addition, although not illustrated, the damper 900 may be formed of the diaphragm 910 in the base body 110 or the damper 900 including the hollow pipe 920 and the baffle 930 may be formed.

Further, the base body 110 includes a fixing groove 112 concavely formed at an inner side of an opened end portion thereof, the cover 120 includes a catching protrusion 121 convexly formed at a position corresponding to that of the fixing groove 112, and the catching protrusion 121 is inserted into the fixing groove 112, such that the cover 120 may be coupled to the base body 110. Here, a contact surface between a step formed at an inner side of the base body 110 and the cover 120 is sealed by a sealing member 130, such that air-tightness between the base body 110 and the cover 120 may be maintained. Further, the case 100 may be closed by various methods such as a method of adhering or fusing the cover 120 to the base body 110, and the like.

In addition, the case 100 may be configured to include a filled liquid inlet 111, and further include a cap 500 closing the filled liquid inlet 111, and the damper 900 may be formed in the cap 500.

That is, the filled liquid inlet 111 for injecting the filled liquid may be provided at an upper side of the base body 110 in a state in which the case 100 stands, and the filled liquid inlet 111 may be closed by press-fitting the cap 500 into the filled liquid inlet 111 after the filled liquid is injected into the inner portion of the case 100. In this case, the damper 900 may be provided in the cap 500, and may be formed of the diaphragm 910 or include the hollow pipe 920 and the baffle 930. However, since the cap 500 is generally formed at a small size, it is preferable that the damper 900 including the hollow pipe 920 and the baffle 930 is used as illustrated in FIGS. 5 and 6.

In addition, the damper 900 may be formed integrally with the cap 500.

That is, a through-hole may be formed in the cap 500 so as to penetrate through an inner portion of the cap 500, and the baffle 930 may move along the through-hole formed in the cap 500. Alternatively, a through-hole may be formed in the cap 500, and the damper 900 including the hollow pipe 920 and the baffle 930 may be inserted and coupled into the through-hole. As a result, the damper 900 and the cap 500 may be formed integrally with each other.

In addition, one side of the arm 300 penetrates through the case 100 to thereby be rotatably coupled to the case 100 or the shaft 610 of the arm installation rotating body 600 to which the arm 300 is fixed penetrates through the case 100 to thereby be rotatably coupled to the case 100, the wiper 400 is coupled to one end of the arm 300 disposed in the case 100 or the shaft 610, and a sealing part 700 may be provided between the case 100 and one end of the arm 300 or between the case 100 and the shaft 610.

The wiper 400 may be configured to be coupled to the arm 300 in the case 100 to thereby be rotated together with the arm 300 or may be configured to be coupled to the shaft 610 of the arm installation rotating body 600, as illustrated in FIGS. 7 and 8, to thereby be rotated together with the shaft 610. Here, the arm 300 or the shaft 610 may be coupled to the case 100 so as to penetrate through the case 100, and the sealing part 700 for sealing may be formed at a portion of the arm 300 or the shaft 610 penetrating through the case 100.

As an example, in the case in which the shaft 610 of the arm installation rotating body 600 to which the arm 300 is coupled and fixed penetrates through the case 100 to thereby be rotatably coupled to the case 100, the sealing part 700 such as an O-ring may be provided at a portion of the shaft 610 penetrating through the case 100 to seal a gap between the case 100 and the shaft 610.

In the case in which a pressure of the inner portion of the case 100 becomes higher than that of the outer portion of the case 100, the filled liquid of the inner portion of the case 100 may be leaked to the outer portion of the case 100 through a contact surface between the shaft 610 and the sealing part 700 or a contact surface between the case 100 and the sealing part 700. In addition, in the case in which a pressure of the inner portion of the case 100 becomes lower than that of the outer portion of the case 100, a fuel present at the outer portion of the case 100 may be introduced into the inner portion of the case 100 through the contact surface described above. In this case, the damper 900 absorbs the pressure change of the inner portion of the case 100, thereby making it possible to more firmly maintain the sealing by the sealing part 700.

In exemplary embodiments of the present invention, the damper is configured to absorb the pressure change of the inner portion of the case, such that even though a pressure or a temperature of the outer portion of the case is changed, the filled liquid is not leaked to the outer portion of the case. Therefore, according to exemplary embodiments of the present invention, the durability of the resistor substrate and the wiper in the liquid level sensor for a fuel tank may be improved, and the reliability of the liquid level sensor for a fuel tank may be also improved.

The present invention is not limited to the above-mentioned exemplary embodiments, but may be variously applied. In addition, the present invention may be variously modified by those skilled in the art to which the present invention pertains without departing from the gist of the present invention claimed in the claims.

What is claimed is:
1. A liquid level sensor for a fuel tank, comprising:
a case fixed to the fuel tank, and having a filled liquid filling space formed therein and closed;
a filled liquid inlet formed on an exterior of the case to inject a filled liquid into the filled liquid filling space;
a resistor substrate provided in the case;
a wiper contacting the resistor substrate and rotated depending on a liquid level of the fuel tank; and
a damper closing the filled liquid inlet and absorbing a pressure change of an inner portion of the case, wherein the damper includes:
a hollow pipe of which an inner portion is hollow and ends are opened;
a baffle provided in the inner portion of the hollow pipe, closely adhered to an inner peripheral surface of the hollow pipe, and coupled to the hollow pipe to be movable along the inner portion of the hollow pipe; and an elastic means having one side coupled to the hollow pipe and an other side coupled to the baffle, wherein the damper further includes steps protruding at ends of an inner peripheral surface of the hollow pipe, and wherein the baffle is configured so as not to be separated from the inner portion of the hollow pipe by the steps.

2. The liquid level sensor that adapts to pressure changes of claim 1, wherein one end of an arm penetrates through the case to thereby be rotatably coupled to the case or a shaft of an arm installation rotating body to which the arm is fixed penetrates through the case to thereby be rotatably coupled to the case, and one end of the arm or the shaft is coupled to the wiper, and a sealing part is provided between the case and one end of the arm or between the case and the shaft.

* * * * *